United States Patent [19]
Teng

[11] Patent Number: 6,105,306
[45] Date of Patent: Aug. 22, 2000

[54] PORTABLE ELECTRONIC INSECT-KILLING DEVICE

[76] Inventor: Hsi-Hsiung Teng, No. 53, An-Le Rd., Lin-Ya Dist., Kaohsiung City, Taiwan

[21] Appl. No.: 09/178,806

[22] Filed: Oct. 26, 1998

Related U.S. Application Data

[63] Continuation-in-part of application No. 08/876,188, Jun. 18, 1997, abandoned.

[51] Int. Cl.[7] .............................. A01M 1/22; A01M 3/02
[52] U.S. Cl. ................................................ 43/112; 43/137
[58] Field of Search .................................. 43/98, 112, 137

[56] References Cited

U.S. PATENT DOCUMENTS

| | | | |
|---|---|---|---|
| 1,754,748 | 4/1930 | Frost | 43/112 |
| 1,910,623 | 5/1933 | McWilliams et al. | 43/112 |
| 1,966,999 | 7/1934 | Sykes | 43/112 |
| 2,117,767 | 5/1938 | Lindsley | 43/112 |
| 2,177,846 | 10/1939 | Swangren | 43/112 |
| 2,218,369 | 10/1940 | Whipple | 43/112 |
| 2,881,554 | 4/1959 | Laine | 43/137 |
| 3,685,198 | 8/1972 | Smith | 43/112 |
| 3,758,980 | 9/1973 | Bialobrezeski | 43/112 |
| 5,519,963 | 5/1996 | Shih | 43/137 |
| 5,533,298 | 7/1996 | Teng | 43/112 |

*Primary Examiner*—Michael J. Carone
*Assistant Examiner*—Darren Ark
*Attorney, Agent, or Firm*—Abelman, Frayne & Schwab

[57] ABSTRACT

A portable electronic insect-killing device includes a handle connected to an insulating frame which has top and bottom frame portions, and a plurality of negative and positive bare wires which extend alternately from the top to bottom frame portions in a plane. The top frame portion has a front surface adjacent and parallel to the plane of the wires, and a plurality of shallow recesses in the surface to receive the negative and positive wires. Adjacent shallow recesses are spaced apart from each other via deep isolating valleys which are indented from the front surface to a depth greater than the depth of the shallow recesses. The shallow recesses and deep isolating valleys have substantially the same length along the direction of the bare wires so that the top frame portion is free of any part to bridge adjacent shallow recesses, thereby preventing possible occurrence of short-circuiting when the surface of the top frame portion is wetted. The bottom frame portion is toothed to form spaced apart forwardly projecting isolated teeth to position lower ends of the wires so that the surface thereof adjacent to the plane of the wire is free of bridging parts between two adjacent teeth.

5 Claims, 4 Drawing Sheets

PORTABLE ELECTRONIC INSECT-KILLING DEVICE

CROSS-REFERENCE TO RELATED APPLICATION

This is a continuation-in-part (CIP) of U.S. patent application Ser. No. 08/876,188, filed on Jun. 18, 1997, now abandoned.

BACKGROUND OF THE INVENTION

1. Field of the Invention

The present invention relates to an insect-killing device, and more particularly to an improved portable electronic insect-killing device having a screen with isolated parallel positive and negative bare output wires.

2. Description of Related Art

Various kinds of electric insect-killing devices have been suggested in the art. U.S. Pat. No. 1,754,748 to Frost discloses an insect destroyer which comprises alternately disposed negative and positive wires extending between two opposing frame parts of an insulative frame. The frame parts are provided with U-shaped slots or cut-outs to receive and position the wires at intervals, and the surfaces of the frame parts adjacent to the wires are substantially flush with the plane of the wires. The frame as such may encounter a problem in that, when the frame surfaces are wetted, the wetted frame surfaces may cause a short circuit because they bridge adjacent wires.

U.S. Pat. No. 1,910,623 to McWilliams et al discloses another insect destroyer which has an insulating frame with oblique grooves to receive alternately arranged negative and positive wires. The grooved surface can bridge adjacent wires as it is substantially flush with the plane of the wires.

Sykes (U.S. Pat. No. 1,966,999) discloses an apparatus for electrocuting insects. The apparatus has a plurality of insulating blocks each of which has deep and shallow notches for positioning wires. The deep notches are deeper than the shallow notches from a surface perpendicular to the plane of the wires. Along the plane of the wire, there are no deep grooves in the surface of the insulating block such that the surface is substantially flush with the plane of the wires.

Smith (U.S. Pat. No. 3,685,198) discloses an electrical grid system which has parallel wires connected to intersecting conductive rods so that the conductive rods bridge the parallel wires.

U.S. Pat. No. 3,758,980 to Bialobrzeski discloses opposing insulating channels for mounting the ends of parallel conductors of a grid assembly. The parallel conductors are positioned to the channels via bus portions integral with the ends of the conductors. The bus portions are mounted in abutment with a surface of the insulating channels which are not provided with any wire receiving groove.

U.S. Pat. No. 5,533,298 owned by the applicant of this application discloses an insect-killing device which includes a handle and a frame. A top portion of the frame defines a plurality of recesses, while a bottom portion of the frame defines a plurality of channels of distinct height corresponding to the recesses. Each channel defines a hole. A plurality of bare output wires A and a plurality of bare output wires B are alternately arranged in parallel within the frame. The upper ends of the bare output wires A and the bare output wires B are alternately received in the recesses, whereas the lower ends of the bare output wires A and the bare output wires B alternately extend through the holes of the channels to connect with a power supply unit in the handle. Also, an upper cover is combined with a lower cover to seal the lower ends of the wires A and B. In this device, the surfaces of the top and bottom frame parts adjacent to the wires are substantially flush with the plane of the wires. Therefore, in the event that the surfaces of the frame parts are wetted when pursuing and capturing a reptile on a wet surface, the wetted frame surface may result in a short circuit and in eventual power loss.

SUMMARY OF THE INVENTION

An object of the present invention to provide an improved portable electronic insect-killing device to mitigate and/or obviate the aforementioned problems.

Another object of the present invention is to provide an improved portable electronic insect-killing device which has efficiently isolated positive and negative bare wires to effectively avoid short-circuiting caused by the frame when the frame is wetted.

According to the present invention, a portable electronic insect-killing device comprises: a longitudinal handle having a power supply unit disposed therein; an insulating frame having a top frame portion, and a bottom frame portion longitudinally spaced apart from the top portion, the bottom frame portion being mounted on the handle; and a plurality of negative and positive bare wires which extend from the top frame portion to the bottom frame portion and which are alternately arranged in parallel in a plane. The top frame portion has a front surface adjacent and parallel to the plane of the bare wires, and a plurality of spaced apart shallow recesses in the front surface to receive the negative and positive bare wires. The shallow recesses are spaced apart from each other by deep isolating valleys which are indented from the front surface to a depth greater than the depth of the shallow recesses. The shallow recesses and the deep isolating valleys have substantially the same length along the direction of the negative and positive bare wires so that the front surface of the top frame portion is free of a part to bridge any two adjacent shallow recesses.

The bottom frame portion includes a plurality of wire holes which are isolated from each other for passage of the negative and positive bare wires, respectively, a first power line to electrically connect with the negative bare wire, and a second power line to electrically connect with the positive bare wire, the first and second power lines being electrically connected to the power supply unit.

Preferably, the bottom frame portion may further have a front surface adjacent and parallel to the plane of the bare wires, which is toothed to form a plurality of spaced apart forwardly projecting teeth each of which is formed with one of the wire holes.

Other objectives, and features of the invention will become more apparent from the following detailed description when taken in conjunction with the accompanying drawings, in which:

BRIEF DESCRIPTION OF THE DRAWINGS

FIG. 3A is a detail of a part of FIG. 3, and

DETAILED DESCRIPTION OF THE PREFERRED EMBODIMENT

Figure 1:
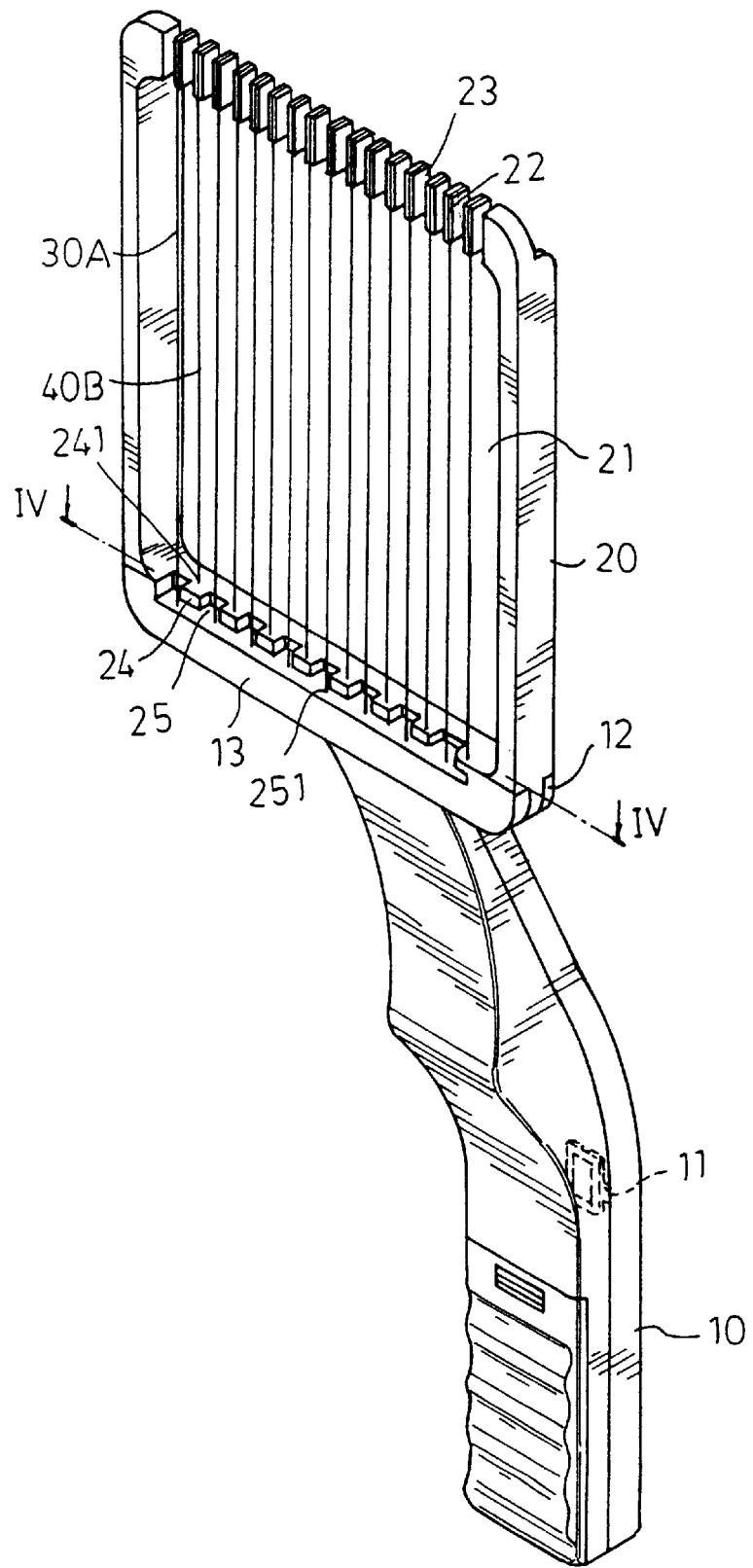
FIG. 1 is a perspective view of an insect-killing device according to the present invention.

Referring to FIGS. 1 to 4, an insect-killing device according to the present invention is shown to include a longitudinal handle 10 and an insulating frame 20. The handle 10 has a power supply unit (not shown) there inside and a switch 11 to control the power supply unit. The frame 20 has a rectangular shape and four frame portions to confine a central space 21. The bottom frame portion 20A of the frame 20 is connected transversely to the longitudinal handle 10. The top frame portion 20B of the frame 20 is substantially parallel to the bottom frame portion 20A.

The top frame portion 20B has in the front surface thereof a plurality of shallow recesses 22. The shallow recesses 22 are spaced apart from each other via deep isolating valleys 23 which are indented from the front surface of the top frame portion 20B to a depth greater than the depth of the shallow recesses 22. The shallow recesses 22 and the deep isolating valleys 23 have substantially the same length along the direction of the negative and positive bare wires 30A and 40B so that the front surface of the top frame portion 20B is free of a part to bridge any two adjacent shallow recesses 22, thereby eliminating the problem of short-circuiting caused by the front surface of the top frame portion 20B in case the latter is wetted.

Figure 2:
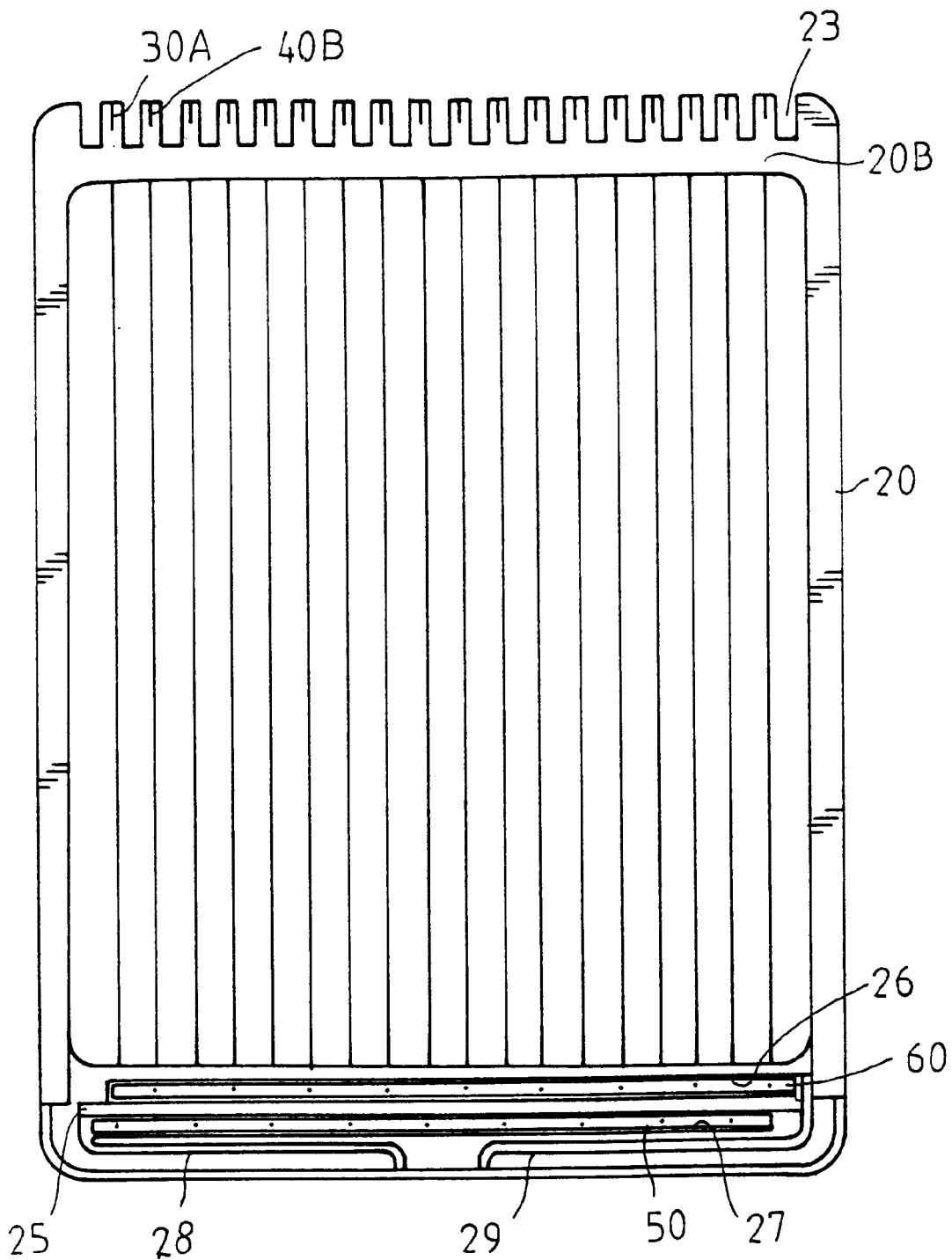
FIG. 2 is a rear elevation view of an insulating frame of the insect-killing device, with front and rear covers of the bottom frame portion of the insulating frame being removed.

The bottom frame portion 20A of the frame 20 is covered by a front cover 13 and a rear cover 12. An elongated through-hole 25 is provided in the bottom frame portion 20A along the direction of the length of the bottom frame portion 20A, as best shown in FIG. 2. The part of the bottom frame portion 20A above the through-hole 25 is toothed to form a plurality of spaced apart forwardly projecting teeth 24 each of which is formed with a second wire hole 241. The part of the bottom frame portion 20A below the through-hole 25 is provided with first wire holes 251 immediately below the corresponding gaps each of which is formed between two adjacent teeth 24. At the rear side of the bottom frame portion 20A, there are provided a first receiving cavity 27 to receive a first power line 50 below the through-hole 25, a second receiving cavity 26 above the through-hole 25 to receive a second power line 60, a first wire casing 28, and a second wire casing 29.

A plurality of negative and positive bare wires 30A and 40B are alternately arranged in parallel in a plane adjacent and parallel to the front surface of the top and bottom frame portions 20B and 20A. Upper ends of the bare wires 30A and 40B are received in the recesses 22, respectively, and have hook ends (not shown) to engage the corresponding recesses 22 of the top frame portion 20B. In the bottom frame portion 20A, the bare wires 30A and 40B pass through the first and second wire holes 251 and 241, respectively.

Figure 3:
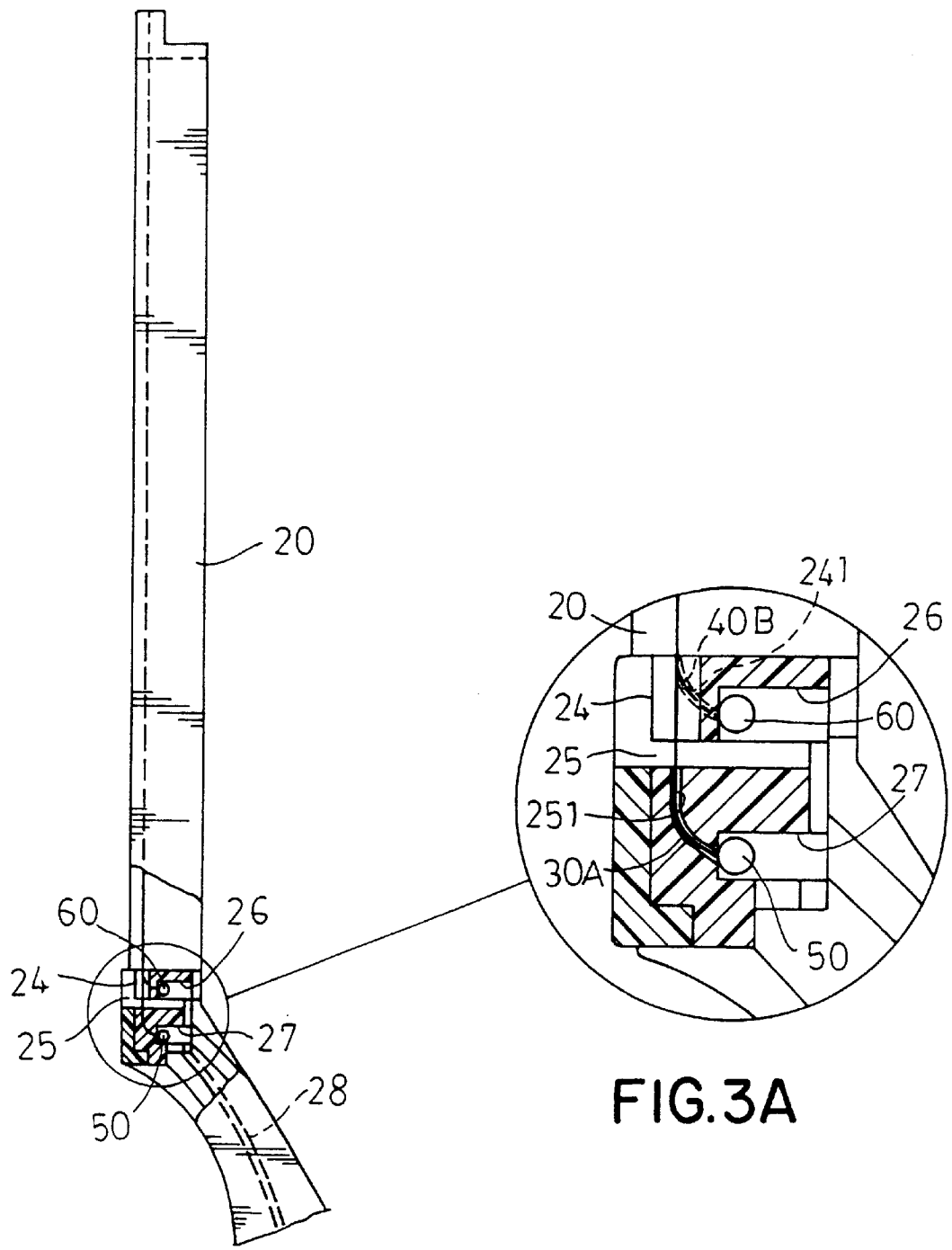
FIG. 3 is a side elevation view of the insulating frame.
Figure 4:
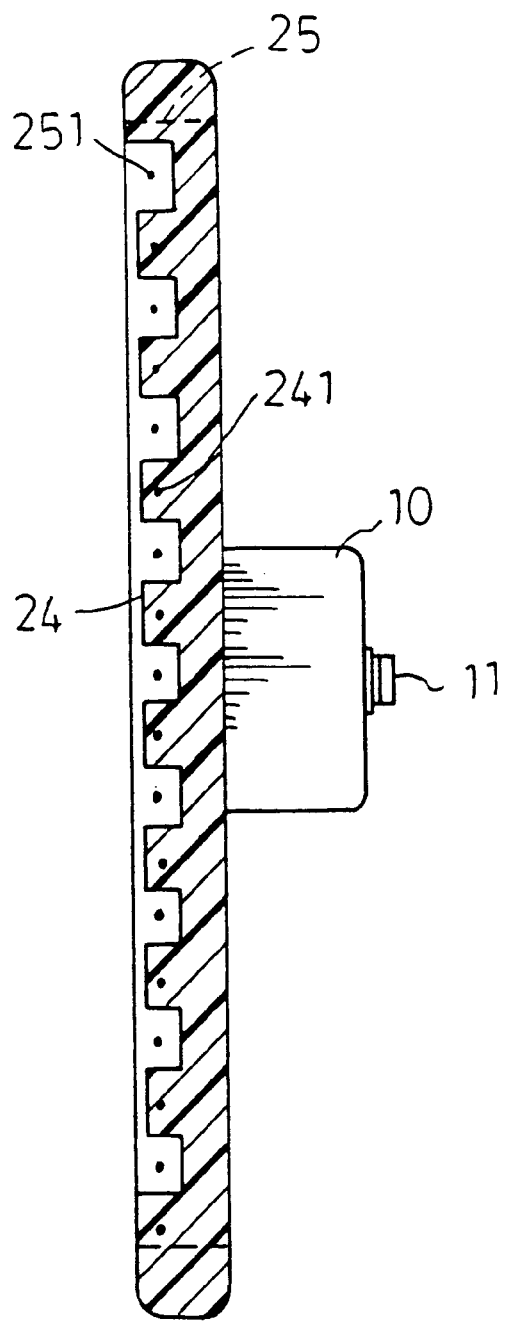
FIG. 4 is a cross-sectional view taken along line IV—IV of FIG. 1.

As best shown in FIG. 3, the lower ends of the bare wires 30A are connected electrically to the first power line 50 and then to the power supply unit via the first wire casing 28. The lower ends of the bare wires 40B are connected electrically to the second power line 60 and then to the power supply unit via the second wire casing 29.

The front cover 13 is provided adjacent to a front surface of the part of the bottom frame portion 20A below the through-hole 25, thereby preventing the risk of wetting the part below the through-hole 25 and the first wire holes 251 when the frame 20 is used in a wet area. The rear cover 12 covers the first and second receiving cavities 27 and 26 which are formed behind the first and second wire holes 251 and 241. The through-hole 25 forms an isolating hollow space between the rows of the first and second wire holes 251 and 241 and between the first and second power lines 50 and 60. In addition, as the front surface of the part of the bottom frame portion 20A above the through-hole 25 is toothed to form spaced apart teeth 24, the front surface of the part above the through-hole 25 is free of any part to bridge the teeth 24 as well as the second wire holes 241.

With the invention thus explained, it is apparent that various modifications and variations can be made without departing from the spirit of the present invention. It is therefore intended that the invention be limited only as indicated in the appended claims.

What I claim is:

1. A portable electronic insect-killing device comprising:
    a longitudinal handle having a power supply unit disposed therein;
    an insulating frame having a top frame portion, and a bottom frame portion longitudinally spaced apart from said top frame portion, said bottom frame portion being mounted on said handle; and
    a plurality of negative and positive bare wires which extend from said top frame portion to said bottom frame portion and are alternately arranged in parallel in a plane;
    said top frame portion having a front surface adjacent and parallel to the plane of said bare wires, and a plurality of spaced apart shallow recesses in said front surface to receive said negative and positive bare wires, said shallow recesses being spaced apart from each other by deep isolating valleys which are indented from said front surface to a depth greater than the depth of said shallow recesses, said shallow recesses and said deep isolating valleys having substantially the same length along said front surface along the direction of said negative and positive bare wires so that said front surface of said top frame portion is free of a part to bridge any two adjacent ones of said shallow recesses; and
    said bottom frame portion having a plurality of wire holes which are isolated from each other for passage of said negative and positive bare wires, respectively, a first power line to electrically connect with said negative bare wires, and a second power line to electrically connect with said positive bare wires, said first and second power lines being electrically connected to said power supply unit.

2. The portable electronic insect-killing device as claimed in claim 1, wherein said bottom frame portion further has a front surface adjacent and parallel to said plane of said bare wires, said front surface of said bottom frame portion being toothed to form a plurality of spaced apart forwardly projecting teeth each of which is formed with one of said wire holes.

3. The portable electronic insect-killing device as claimed in claim 1, wherein said bottom frame portion further has an elongated through-hole that extends along the length of said bottom frame portion, said wire holes including first wire holes arranged in a row below said through-hole for passage of said negative bare wires, and second wire holes arranged in a row above said through-hole for passage of said positive bare wires, said bottom frame portion further having a first receiving cavity disposed below said through-hole to receive said first power line, and a second receiving cavity above said through-hole to receive said second power line, said through-hole forming an isolating hollow space between said rows of said first and second wire holes and between said first and second power lines.

4. The portable electronic insect-killing device as claimed in claim 3, wherein said bottom frame portion further has a front surface adjacent and parallel to said plane of said bare wires, said front surface of said bottom frame portion being located above said through-hole and being toothed to form a plurality of spaced apart forwardly projecting teeth, said second wire holes being formed in said teeth, respectively.

5. The portable electronic insect-killing device as claimed in claim 4, wherein said bottom frame portion further has a front cover adjacent to said plane of said bare wires, and a part which is covered by said front cover and which is located below said through-hole to bear said first wire holes, said first and second receiving cavities being formed in said bottom frame portion behind said first and second wire holes, said bottom frame portion further having a rear cover to cover said first and second receiving cavities.

\* \* \* \* \*